(12) United States Patent
Stuckman et al.

(10) Patent No.: US 7,907,716 B2
(45) Date of Patent: Mar. 15, 2011

(54) SYSTEM AND METHOD FOR FACILITATING ENHANCED CALL AWARENESS

(75) Inventors: Bruce Edward Stuckman, Austin, TX (US); Russell William White, Austin, TX (US)

(73) Assignee: AT&T Intellectual Property L.L.P., Reno, NV (US)

( * ) Notice: Subject to any disclaimer, the term of this patent is extended or adjusted under 35 U.S.C. 154(b) by 1406 days.

(21) Appl. No.: 10/867,278

(22) Filed: Jun. 14, 2004

(65) Prior Publication Data
US 2005/0277408 A1  Dec. 15, 2005

(51) Int. Cl.
*H04M 3/42* (2006.01)
*H04M 1/64* (2006.01)
*H04L 12/66* (2006.01)

(52) U.S. Cl. .............. 379/211.01; 379/70; 379/88.12; 379/207.05; 379/215.01; 370/352

(58) Field of Classification Search .......... 379/211.01, 379/88.17, 215.01, 70, 88.12, 207.04, 207.05; 370/401, 352
See application file for complete search history.

(56) References Cited

U.S. PATENT DOCUMENTS

| | | | |
|---|---|---|---|
| 5,805,587 A * | 9/1998 | Norris et al. | 370/352 |
| 6,307,930 B1 | 10/2001 | Mayer et al. | |
| 6,442,245 B1 * | 8/2002 | Castagna et al. | 379/88.12 |
| 6,804,334 B1 * | 10/2004 | Beasley et al. | 379/88.17 |
| 6,842,448 B1 * | 1/2005 | Norris et al. | 370/352 |
| 6,914,971 B1 * | 7/2005 | Bruening | 379/215.01 |
| 7,466,802 B2 * | 12/2008 | Lew et al. | 379/88.12 |
| 2002/0126679 A1 * | 9/2002 | Morton | 370/401 |
| 2002/0168055 A1 | 11/2002 | Crockett et al. | |
| 2003/0058858 A1 | 3/2003 | Berlyoung et al. | |
| 2003/0074404 A1 | 4/2003 | Parker et al. | |
| 2003/0099333 A1 * | 5/2003 | Castagna et al. | 379/70 |
| 2003/0228011 A1 | 12/2003 | Gibson | |
| 2004/0114541 A1 | 6/2004 | Caspi et al. | |
| 2004/0219906 A1 | 11/2004 | Benco et al. | |
| 2005/0074109 A1 * | 4/2005 | Hanson et al. | 379/207.04 |
| 2005/0123118 A1 | 6/2005 | Terry et al. | |
| 2005/0277408 A1 | 12/2005 | Stuckman et al. | |
| 2008/0031284 A1 | 2/2008 | Alderson et al. | |

FOREIGN PATENT DOCUMENTS

| | | |
|---|---|---|
| WO | 00/46973 A2 | 8/2000 |
| WO | 00/46973 A3 | 8/2000 |
| WO | 2004/032477 A1 | 4/2004 |

OTHER PUBLICATIONS

International Search Report for International Application No. PCT/US 05/18216, mailed on Jul. 9, 2008.

(Continued)

*Primary Examiner* — Thjuan K Addy
(74) *Attorney, Agent, or Firm* — Toler Law Group

(57) ABSTRACT

A system and method are disclosed for facilitating enhanced call awareness. A system incorporating teachings of the present disclosure may include an interface that receives a signal associated with a call to a telephone number. A call information engine may be coupled to the interface and may recognize that a party to the call subscribes to an enhanced call activity service. In some cases, the party may be a called party or a calling party, and the activity may include an incoming call to the telephone number, an outgoing call, a missed call, or a waiting voicemail message. A memory may maintain a data network address for the party, and a messaging engine may initiate sending of a message containing call information to the data network address. The message may be sent in response to a trigger signal output by a notification engine without consideration for whether or not a telephone line associated with the telephone number is busy.

33 Claims, 5 Drawing Sheets

OTHER PUBLICATIONS

Written Opinion of the International Searching Authority for PCT/US 05/18216, mailed on Jul. 9, 2008.
Non-Final Action for U.S. Appl. No. 11/115,982, mail date Jan. 23, 2009, 10 pp.
Final Office Action for U.S. Appl. No. 11/115,982, mail date Jul. 15, 2009, 9 pp.
Non-Final Office Action for U.S. Appl. No. 11/115,982, mail date Dec. 29, 2009, 15 pp.

* cited by examiner

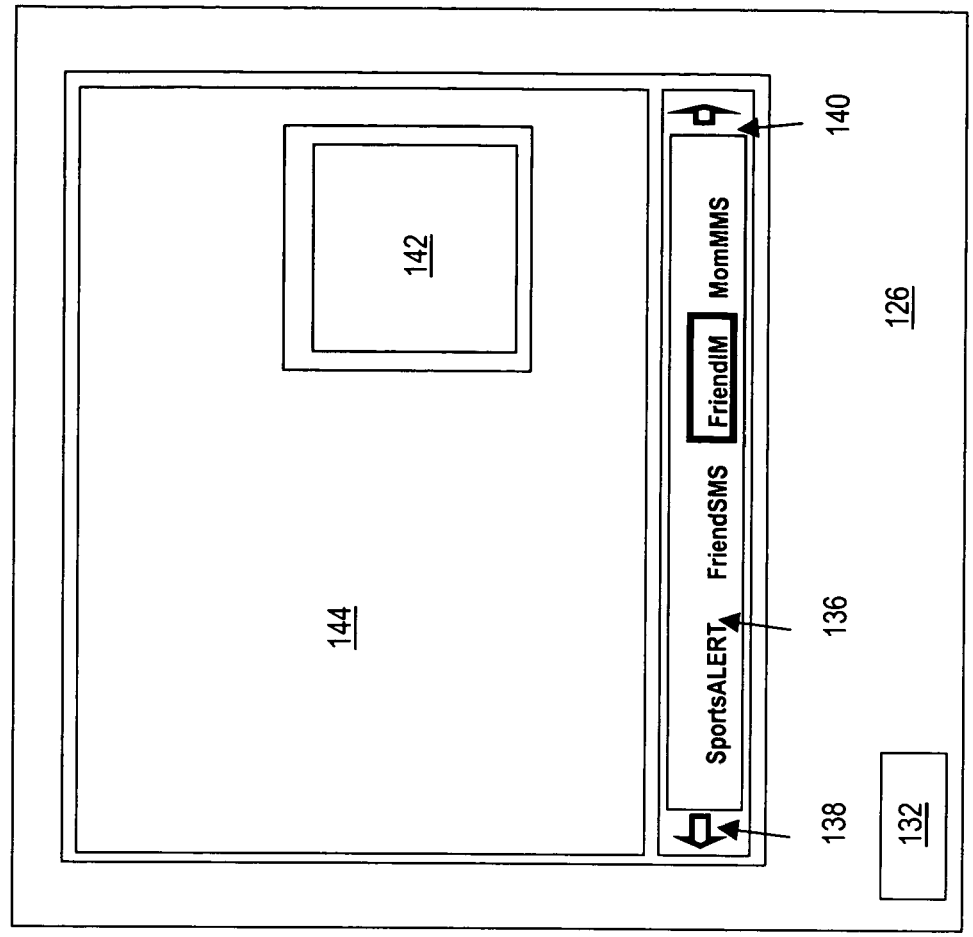
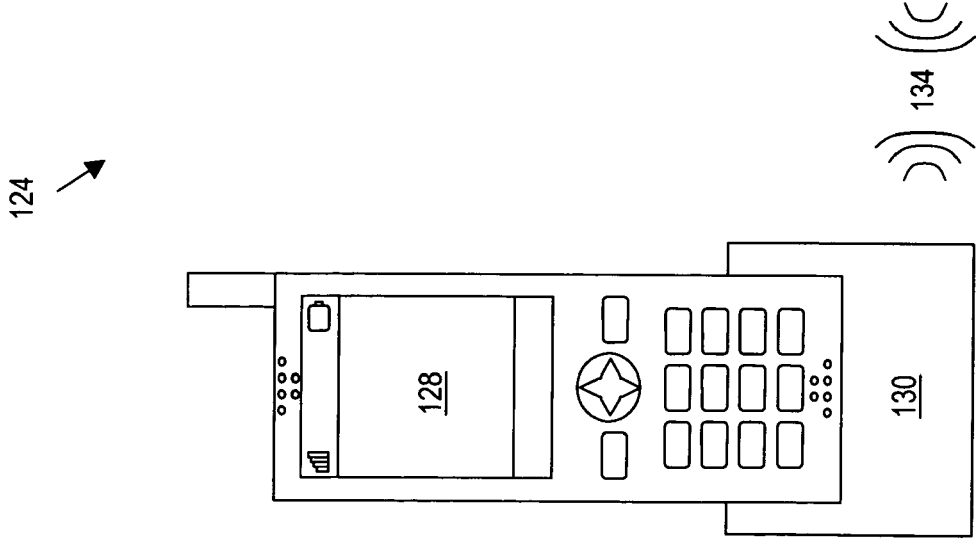
FIG. 5

SYSTEM AND METHOD FOR FACILITATING ENHANCED CALL AWARENESS

BACKGROUND

Telecommunication companies often provide to their customers information about incoming calls. One common service is caller identification (Caller ID). Standard Caller ID services generally provide a customer with an indication of who is calling without requiring the customer to answer the call. In operation, the system's supporting Caller ID may retrieve information about the calling party from a database and provide that information to the called party.

Often, this information is presented on a display associated with a piece of customer premise equipment (CPE). A visual readout of the name and/or the telephone number associated with the calling party may appear on the display, and, as such, the called party may be in a position to decide whether or not to answer the call. While Standard Caller ID has proven to be popular, an enhanced level of call awareness may appeal to many customers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 5 depicts a communication system that may be used to implement teachings of the present disclosure to present messages on an alternate device.

DETAILED DESCRIPTION OF THE DRAWINGS

Figure 1:
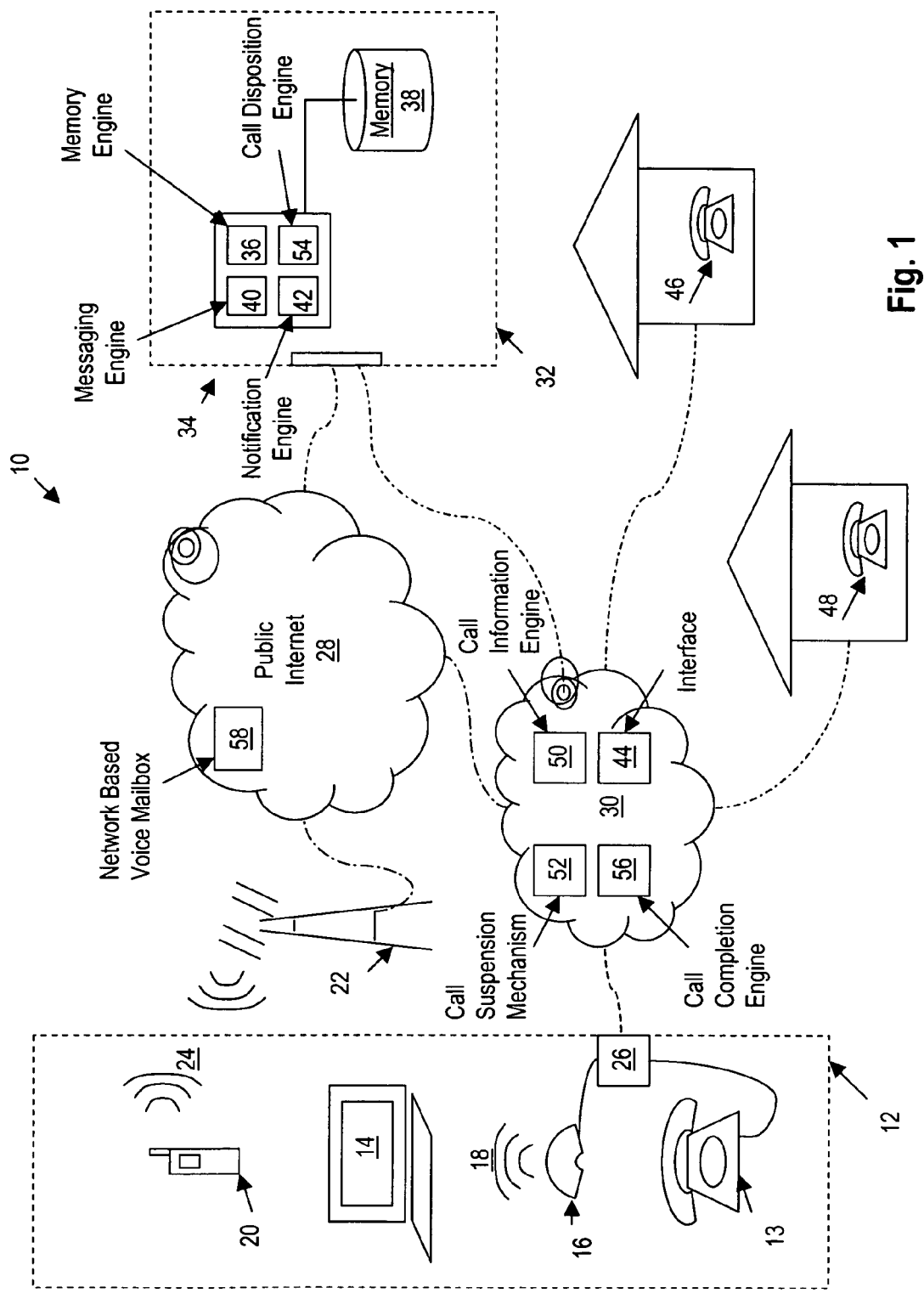
FIG. 1 presents a block diagram of an enhanced call activity notification system that incorporates teachings of the present disclosure.

Enhanced call awareness may take many forms. For example, a remote user may need to be made aware of call activity for a given telephone number. Perhaps a user wants to "see" Caller ID information while the user is on-line or connected to the Public Internet. A relatively simple service presenting Caller ID information to a user across a dial-up Internet connection (Internet Caller ID) may appeal to users. Such a service may make use of Advanced Intelligent Network (AIN) functionality or other similar signaling functions used, for instance, in the setup and control of telephone calls placed over a communications network.

If a telephone call is directed to a home telephone, a switch may recognize that the telephone line is busy and an AIN query may be launched to determine if the called party is using the telephone line to connect to a communication network such as the Internet. If the called party is on-line, a pop-up message may be sent via the on-line connection. In one embodiment, an Internet Service Provider (ISP) may pass Caller ID information to a subscriber of the Internet Caller ID service, and the subscriber may be presented with a limited number of call disposition options. The subscriber may, for example, request that a certain message be played to the calling party, may route the call to voice mail, and/or elect to end the on-line session and take the call.

The above-described service may be applied, for example, in circumstance where the subscriber enjoys one telephone line and a dial-up connection. Users availing themselves of additional communication assets and broadband connections may find more enhanced services to be attractive. For example, some subscribers may want to be informed when a 911 call has been placed from a telephone station associated with a given telephone number. Perhaps a subscriber has an elderly relative living at the subscriber's home. If the relative needs help when the subscriber is at work, the relative may dial 911. In some embodiments, such an event may be reported to the subscriber.

Other subscribers may want the ability to route an incoming call to destinations other than or in addition to voicemail. For example, a subscriber may want a call routed to a new location. The new location may be associated with a wireline telephone, a computer, a cellular telephone, a Voice-over Internet Protocol (VoIP) telephone, and/or some other device capable of performing communication functions. A telephone number or address, associated with the new location, may be pre-programmed into an element of the enhanced call information service. In some embodiments, the user may update this pre-programmed addressing information.

As mentioned above, a subscriber may want to route an incoming call to voicemail or unified messaging service. In some embodiments, the subscriber may want to receive a text-based and/or audio-based version of the message. For example, a calling party may leave a message, and the enhanced call information service may attach a text file, a .wav file, and/or some other file to an electronic message. The electronic message with attachments may then be sent to the subscriber. As such, the subscriber may have the ability to direct a call to voicemail and be in a position to know the contents of the voicemail message without actively checking the voice mailbox, which may involve pausing to call the voicemail service, entering appropriate mailbox and password information, and listening to a recorded message. In one embodiment, the above-described service options, as well as the other potential service options, may be implemented as session-initiated protocol applications (SIPs).

SIP offers a text-based description protocol that allows two systems to describe a media stream, which may be for example voice traffic, that needs to get from point A to point B. The description itself may include information relating to authentication, caller ID, media stream parameters, and/or other information for supporting a call between the two endpoints.

In operation, a call intended for a dialed number may be received in network on a channel. A call receipt process may begin in order to learn what to do and where to "send" the received call. For example, a dialed number, or some other type of device address may be translated into a variable for use during call processing activities. The processing activities may include, for example, a number of match tests performed against the variable. These match tests may be executed until a match is found.

A found match may have several allocated operators. These operations may have a priority indicator or number telling a processing server in what order the server should attempt to execute the applications associated with the found match. If, for example, there are three operations associated with a given match, a SIP-based system may prioritize the operations by giving them respective priority values of 1, 2, and 3—telling the processing server to try the priority 1 operation first.

In one embodiment, if an inbound call is directed to a dialed number, 345-6789, a variable value of 6789 may be assigned to the dialed number. The variable may then be compared against a list of match statements to determine how to handle the call. If the priority 1 application for the match is "Dial," this application may be performed.

The Dial application may direct the processing server to ring a remote channel and then connect the two channels together if the call is answered. The Dial application may also have additional capabilities. As mentioned above, if a Dial application gets an answer on the remote channel, the two callers may be bridged together and the call may proceed. After the call, one or both parties to the call may elect to hang up. When this occurs, the Dial routine may exit with a non-zero status, and the priority list may stop executing because the call is terminated.

In some cases, there may be no answer to the call launched by the Dial application. If, for example, the Dial application rings a remote phone for some set amount of time, which may be specified in a Dial statement, and there is no answer, Dial may exit and the next priority application may be executed. In many cases, the next application may be a voicemail application, and the caller may hear an "unavailable" greeting for the called party.

If the Dial application gets a "busy" answer back from the remote phone, or the remote phone is not on-line, the Dial application may apply an adder value to the existing priority value—allowing the processing server to bypass the level 2 priority and route directly to a level 3 or higher priority application. For example, the caller may be routed to a "busy" greeting for the called party.

A service provider may elect to provide SIP-like functionality using several different architectures. Depending upon implementation detail, some SIP components may be combination modules or discrete modules, implemented in software, hardware, and/or firmware. From a high level, many SIP system components may be acting as or executing user agents and/or SIP servers.

For example, telephony devices may include user agents (UAs), which may be a combination of a user agent client (UAC) and a user agent server (UAS). In operation, a UAC entity may be permitted to create an original request, and a UAS may represent one or more server types capable of receiving requests and sending back responses. A SIP UA may be implemented in hardware such as an IP phone or a gateway component or in software such as a softphone application running on a computing platform.

Various SIP UAs may connect to one another with the help of a collection of SIP servers. In many cases, these SIP servers may be executing on centralized hosts of a distributed communication network. Again depending upon implementation detail, a large SIP system may include several different kinds of servers such as Location Servers, Proxy Servers, Redirect Servers, and Registrar Servers.

In operation, a Location Server may be used by a Redirect server or a Proxy Server to obtain information about a called party's location. A Proxy Server may represent an intermediary program that acts as both a server and a client for the purpose of making requests on behalf of other clients. Such requests may be serviced internally or transferred to other servers. In some cases, a Proxy Server may interpret and then rewrite a request message before forwarding it. A Redirect Server may accept a SIP request, map the address into zero or more new addresses, and return these addresses to the client.

In some cases, the Redirect Server may be designed such that it does not accept calls but does generate SIP responses that instruct a UAC to contact another SIP entity. As the name implies, a Registrar Server may accept REGISTER requests and may be co-located with a Proxy or Redirect server to offer these servers some level of location server-like assistance.

As referenced above, an AIN, SIP, and/or SIP-like system may facilitate providing enhanced call-awareness features in accordance with the teachings of the present disclosure. Many of these features, in addition to the above-described features are described in connection with the Figures. As mentioned above, FIG. 1 presents a block diagram of an enhanced call information system 10 that incorporates teachings of the present disclosure. As depicted, system 10 includes a remote physical location indicated at 12 that contains various computing devices accessible by a user or subscriber. The devices may include, for example, a wired telephone 13, a laptop computer 14, and a wireless telephone 20, each of which may be capable of acting as a SIP.

In the embodiment of FIG. 1, laptop 14 may a have short-range or local area wireless transceivers that serve to connect laptop 14 to LAN hub 16 across wireless link 18. Wireless phone 20 may be "connected" to a cellular network node 22 across a wireless link 24, which may be, for example, a General Packet Radio Service (GPRS) or some form of Enhanced Data GSM Environment (EDGE). Laptop 14 and wireless phone 20 may each include several electronic components and computing devices. These devices may also include a computer-readable medium having executable computer-readable data to store an address for an enhanced call information service node, to recognize that a data network connection exists, and to initiate sending a message to the service node address via the data network connection. The message may provide access or addressing information that indicates how to send data to laptop 14 and/or telephone 20. The computer-readable data may also have the ability to initiate presentation of a GUI element presenting received data on laptop 14 and/or telephone 20.

Wireless links 18 and 24 may be implemented in several ways. The link type may depend on the electronic components associated with the given wireless devices and wireless LAN hubs. The wireless computing device and/or wireless hub (Wireless Enabled Devices) may include any of several different components. For example, a Wireless Enabled Device may have a wireless wide area transceiver, which may be part of a multi-device platform for communicating data using radio frequency (RF) technology across a large geographic area. This platform may for example, be a GPRS, EDGE, or 3GSM (define) platform, and may include multiple integrated circuit (IC) devices or a single IC device.

A Wireless Enabled Device may also have a wireless local area transceiver that communicates using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of twenty-five to one hundred feet. If the wireless local area transceiver includes an 802.11(x) transceiver, such as an 802.11(a)(b) or (g), the transceiver may have a communication range with an approximate radius of one hundred fifty to one thousand feet.

As shown in FIG. 1, LAN hub 16 may represent an 802.11 (x) embodiment, which may in some cases be referred to as a hotspot. LAN hub 16 may be communicatively coupled to a network bridge 26 capable of connecting hub 16 to a broader network, like Public Internet 28. As shown, both laptop 14 and wireless phone 20 may be ultimately coupled to Public Internet 28. Laptop 14 may connect via link 18 to hub 16 and via bridge 26 to a service provider network 30, which may facilitate connection to public Internet 28. In some embodiments, network 30 may be a cable network, and bridge 26 may include a cable modem. As depicted, network 30 may be a Public Switched Telephone Network (PSTN), and bridge 26 may include an xDSL modem.

In practice, the information communicated across the various links of system 10 may be compressed and/or encrypted prior to communication. Communication may be at least partially via a circuit-switched network like the PSTN, a frame-based network like Fibre Channel, or a packet-switched network that may communicate using Transmission Control Protocol/Internet Protocol ("TCP/IP") packets like Internet 28. The physical medium making up at least some portion of the various links may be coaxial cable, fiber, twisted pair, an air interface, other, or a combination thereof. In some embodiments, network access links may provide a broadband connection facilitated by an xDSL modem, a cable modem, an 802.11x device, some other broadband wireless linking device, or a combination thereof. The broadband connection may include a link providing data rates greater than 56 Kbps. Other broadband connections may provide data rates greater than 144 Kbps, 256 Kbps, 500 Kbps, 1.0 Mbps, 1.4 Mbps, or faster.

In a preferred embodiment of system 10, a user may seek to log into Internet 28 and data services associated therewith. The user may be operating laptop 14 and connect to wireless LAN hub 16 via link 18. The user may then use a browser like Netscape or Internet Explorer to request access to a web-based data service. In some embodiments, the initiation of a new or different network connection may be recognized and a message providing addressing information for laptop 14 may be sent to an enhanced call activity service node 32.

As depicted, service node 32 may be communicatively coupled to service provider network 30. In operation, service node 32 could act in a service bureau mode supporting and/or making itself available to other networks and other service providers. Node 32 may include a gateway 34 or interface that receives network-launched queries as well as addressing information from subscribers. Gateway 34 may communicate with a memory engine 36 that manages and maintains information stored in memory 38. The stored information may include then-current addressing information for laptop 14 and a notification rule for a subscriber using laptop 14. In some embodiments, memory engine 36 may also include an updated engine that allows subscribers to modify their stored addressing information.

During operation of an enhanced call activity service, a messaging engine 40 associated with node 32 may be capable of sending a message addressed to a data network address associated with a subscriber to the service. The message may be communicated across a network such as network 30 and/or Public Internet 28. The messaging engine may be responsive to a trigger signal that may be output by a notification engine 42. The message may include call activity information for a call and may be sent using one or more of several different messaging mechanisms. These mechanisms may include, for example, an electronic mail message, a browser pop-up, a mobile alert, an Instant Message (IM), a Short Messaging Service message (SMS), an Enhanced Messaging Service message (EMS), and/or a Multi-media Messaging Service message (MMS).

As depicted, notification engine 42 may be associated with node 32. Notification engine 42 could also be associated with a service provider network, like network 30. In operation, notification engine 42 may output a trigger signal without consideration for a busy status of a called telephone line. Unlike an Internet Caller ID service that may only send information when a called line is busy, system 10 may send call activity information even in situations where the called line is available. In some embodiments, decisions regarding when to send a call activity message may be made in accordance with a user-specific notification rule, which could include, for example, a send message in connection with all incoming calls setting, a send message in connection with all outgoing calls settings, a send message in connection with incoming calls from identified callers setting, a do not send message setting, a send message in connection with outgoing international calls, a send message in connection with outgoing calls placed to 900, 976 or other toll services and a send message in connection with outgoing 911 calls setting.

In some embodiments, a call activity message may also include a call disposition question. In operation, an interface 44 may receive a signal associated with a call from telephone 46 to a telephone number identifying telephone 48. A call information engine 50 may recognize that a party to the call subscribes to a call activity information service, and a call suspension mechanism 52 may hold the call for some period of time. A call disposition engine 54 may then initiate sending of a call disposition query to a stored data network address of the subscriber. The query may effectively ask the subscriber what the subscriber wants to do with the call. Disposition engine 54 may receive a call disposition command indicating a preferred call disposition, and a call completion engine 56 may route the call in accordance with the call disposition command. In the absence of a timely response, call completion engine 56 may route the call as dialed.

With reference to the above description of a call from telephone 46 to telephone 48, a disposition command may indicate a desire to route the call to telephone 48 as a Plain Old Telephony Service (POTS) call. Other disposition options may include, for example, forwarding the call to a network-based voice mailbox 58, routing the call as a packetized call addressed to laptop 14, and/or ringing through to a different telephone number, which may identify telephone 13 or telephone 20.

As depicted, interface 44, call information engine 50, call suspension mechanism 52, and call completion interface 56 may be included within a network element, such as a switch, a router, or an AIN node of network 30. These engines and mechanisms may also be included within other components and/or networks.

Figure 2:
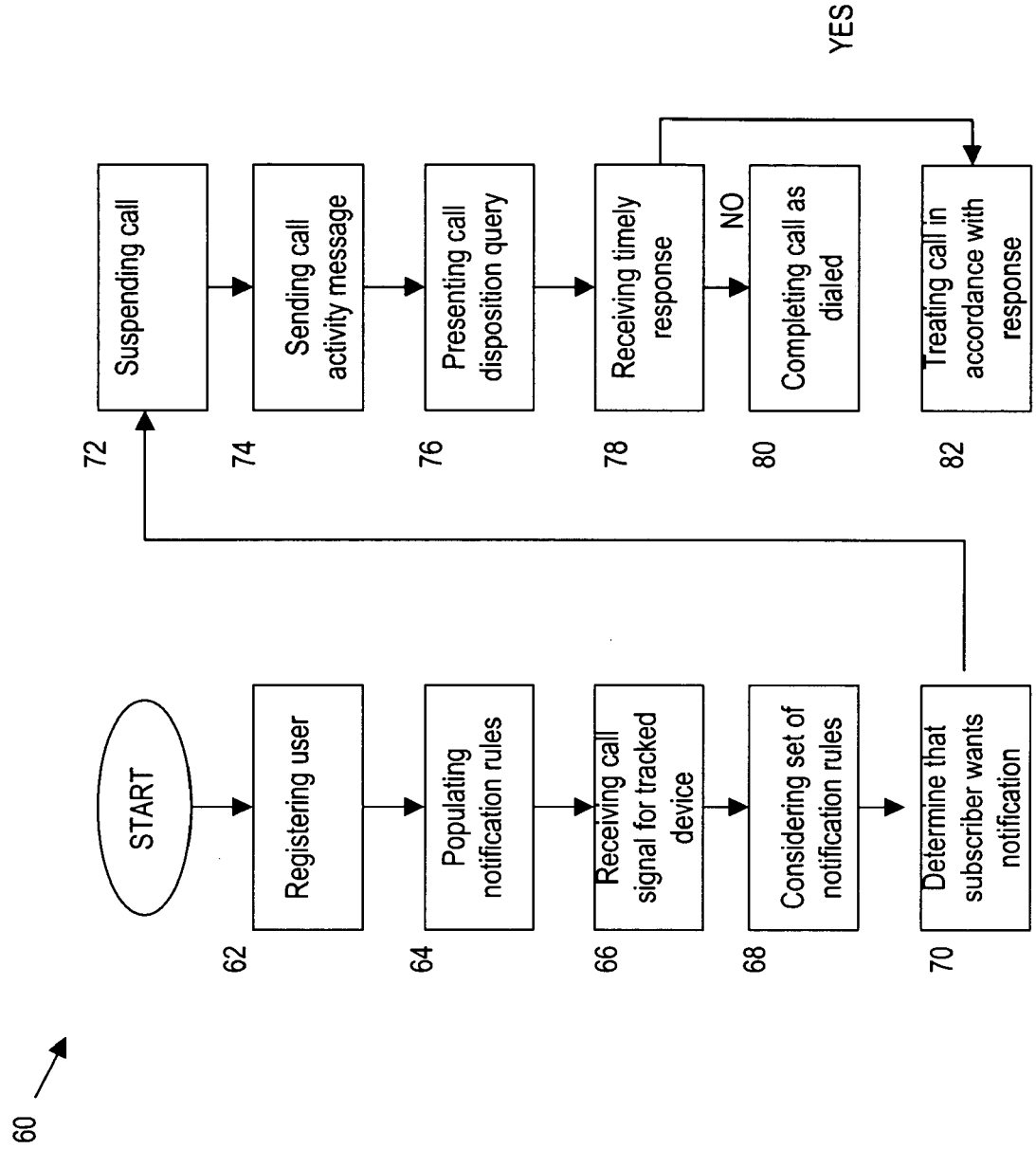
FIG. 2 shows a flow diagram for a technique that may be used to implement teachings of the present disclosure.

Operation of a system 10 may be better understood by reference to FIG. 2. As mentioned above, FIG. 2 shows a flow diagram for a technique 60 that may be used to implement teachings of the present disclosure. At step 62, a subscriber may be identified as someone who wants to receive call activity notifications indicating call activity at one or more tracked telephones and/or messaging devices. A memory may be populated with a subscriber identifier, which may be a ten-digit telephone number and/or an Internet Protocol or MAC address associated with a tracked device. The memory may also be populated with a messaging address to receive call activity notifications.

In some embodiments, the messaging address may include a telephone number, an Internet Protocol address, a data network connection rule, and/or some other address. The messaging address may also be updateable and represent a then-current mechanism for contacting the subscriber. At step 64, subscriber notification rules may be added. A subscriber may not want to receive a call activity message every time there is some call activity at an activity tracked subscriber telephone or messaging device.

At step 66, a signal may be received indicating a desire to complete a call or send a message to a tracked telephone or device associated with the subscriber. The signal may indicate for example a calling party and/or a called party telephone number, and one of these numbers may be the subscriber identifier referenced above in connection with step 62. If, for example, the called party telephone number is the home telephone number of the subscriber, a system like system 10 of FIG. 1 may recognize that the call involves the subscriber.

Details of the call may be compared against the notification rules at step 68, and a determination may be made at step 70 to notify the subscriber. The call may be suspended at step 72, and a call activity message may be generated and communicated to the then-current messaging address at step 74. The then-current messaging address may be the original address referenced above in connection with step 62 or an updated address. The messaging address may be associated with a network-connected computer and/or telephone. The messaging address may also be associated with a wireline connected telephone number. For example, a subscriber may want to receive call activity notification via a voice call to an office phone, a wireless phone, a VoIP phone, a hotel phone, and/or some other phone located in a physical location away from the dialed telephone.

In some embodiments, a call activity message may contain a call disposition query. This query may be presented to the subscriber at step 76, and the subscriber may respond with a call disposition request at step 78. In some cases, the subscriber may not respond to the query, and the call may be completed as dialed at step 80. In other cases, the subscriber may respond, and the call may be treated as requested at step 82.

Figure 3:
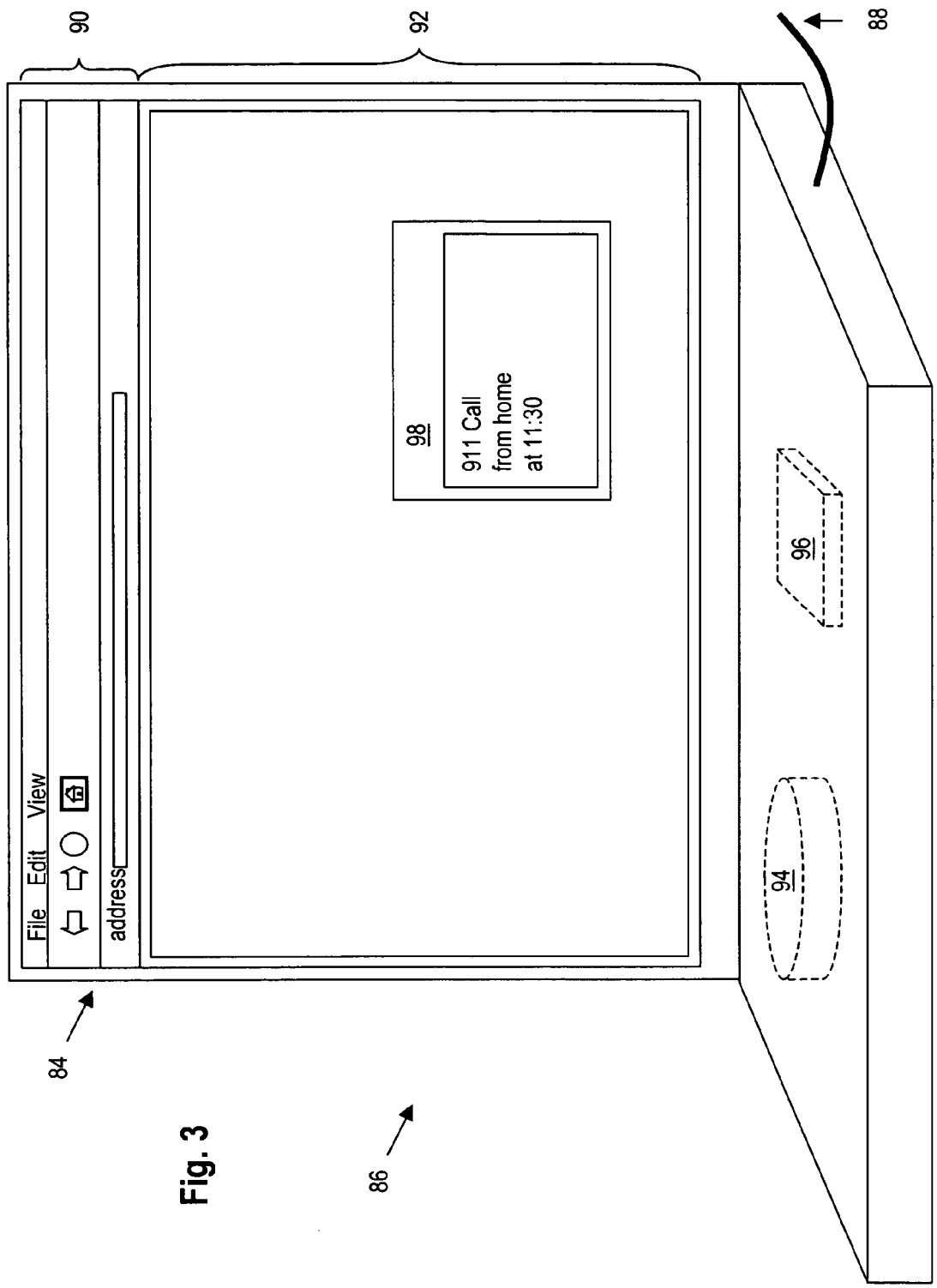
FIG. 3 presents a simplified block diagram for a system that incorporates teachings of the present disclosure to present an enhanced level of call activity awareness.

As mentioned above, FIG. 3 presents a simplified block diagram for a system 84 that incorporates teachings of the present disclosure to present an enhanced level of call activity awareness. System 84 includes a laptop computer 86, which may be communicatively linked via link 88 to a data network like the Public Internet. A web browser application may be running on laptop 84 and may present a user of the laptop with a navigation window 90 and a document pane 92. In operation, a user may type a Uniform Resource Locator (URL) into a portion of navigation window 90 and a page having that URL may be communicated to laptop 84 and presented within document pane 92. When the laptop sends a request for the page having the input URL, a network element of the data network may recognize in the request an address to which it should send the page.

The presence of a network connection at least partially provided via link 88 may be recognized by a component of laptop 86. For example, laptop 86 may include a computer-readable medium 94 storing computer-readable data. Execution of some part of this data by a processor like processor 96 may allow laptop 86 to store an address for an enhanced call information service node, to recognize that a data network connection exists, and to initiate sending a message to the address via the data network connection. In some embodiments, the message may provide access information that indicates how to send call activity information to laptop 86. Laptop 86 may also initiate presentation of GUI element 98 that may, as depicted, present call information to the user within the boundaries of document pane 92.

Figure 4:
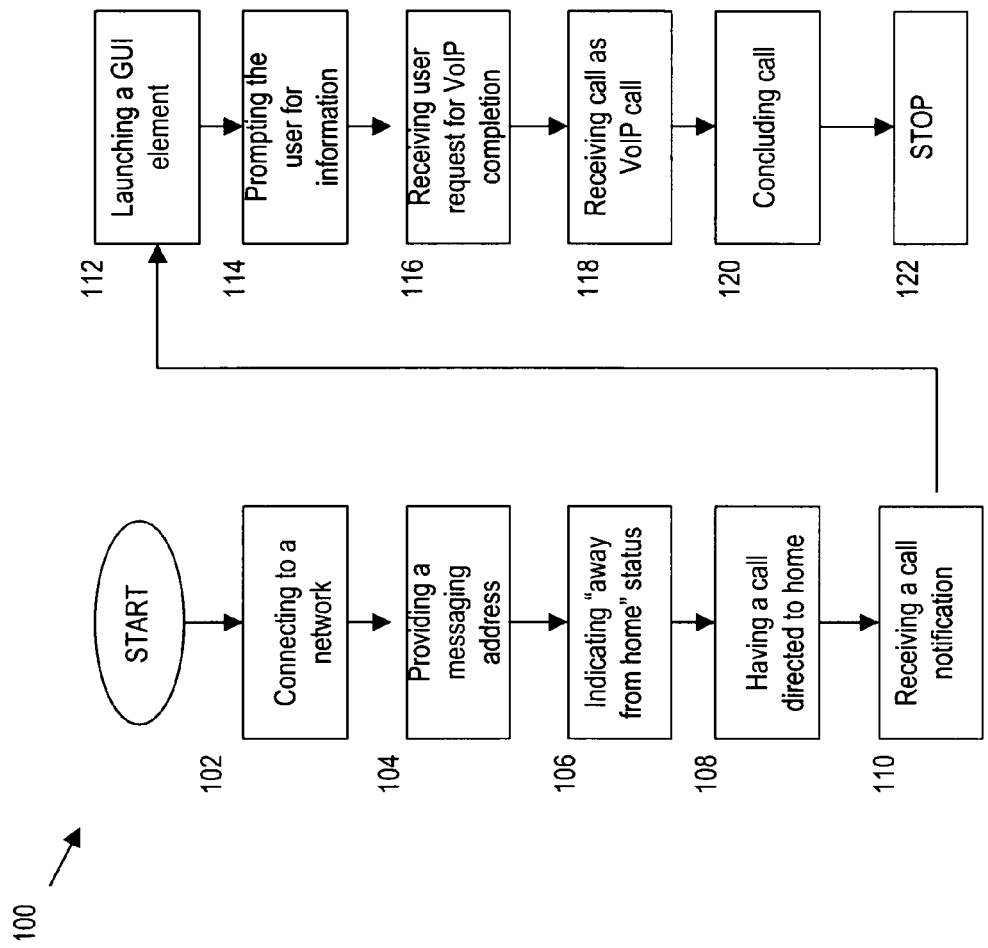
FIG. 4 shows a flow diagram for a technique that may be used to implement teachings of the present disclosure.

FIG. 4 shows a flow diagram for a technique 100 that may be used to implement teachings of the present disclosure. At step 102, a user may connect to a network with a computing device. The network may be a SIP-enabled network capable of communicating packetized data such as Internet Protocol (IP) data packets. At step 104, a messaging address for the user may be sent to a call activity service node reachable via the network, and an "away from home" status indicator may be sent to the node at step 106. The "away from home" status may alert the node that the user wants to be notified of call activity associated with a home telephone or computing device.

At step 108, a call may be directed to the home telephone or computing device, and the user may receive a notification of that activity at step 110. At step 112, a GUI element may be launched and presented on the network-connected computing device. The GUI element may present information about the call activity and may prompt the user to input guidance on how to treat the call at step 114. At step 116, the user may request that the call be routed to the network-connected computing device and completed as a VoIP call.

At step 118, the user may receive and engage in a VoIP telephone call. The calling party may or may not be notified or made aware of the fact that the call placed to a dialed telephone number was completed to a different location and a different device. At step 120, the call may be concluded, and technique may progress to stop at step 122.

As mentioned above in the brief description of the drawings, FIG. 5 depicts a communication system 124 that may be used to implement teachings of the present disclosure to present messages on an alternate device. As depicted, system 124 includes a television 126 and a cellular telephone 128. Cellular telephone 128 may have been docked in device 130. Device 130 may include a wireless beacon and may, in some embodiments, be operable as a wireless local area network hub. As such, device 130 may be in communication with a wired network element such as a cable modem or xDSL modem.

Associated with television 126 is wireless receiver 132. Receiver 132 may be operable to communicate with device 130 using a Radio Frequency (RF) technology. Receiver 132 may couple to television 126 by plugging into a video input jack, a Universal Serial Bus (USB) port, and/or some other interconnection technique. In operation, device 130 may communicate with receiver 132 via a wireless signal 134. As depicted, wireless data messages and message notifications received by telephone 128 have been communicated across wireless link 134 and are being presented as selectable icons in scrolling display 136.

A user of system 124 may interact with television 126 and scroll forward using icon 138 or backward using icon 140 through the received messages and/or notifications. As depicted, the user has selected "FriendIM" and an IM session element 142 has popped-up on display 144. As such, a user may be able to watch a television show on display 144 of television 126 while also keeping track of wireless data being sent to telephone 128. Moreover, a user may make use of existing electronic devices to interact with a wireless messaging service. As such, the user may be able to conserve telephone 128's battery life and view messages on a display having a picture quality and screen size much better than that of telephone 128.

In operation of systems like system 10, incorporating teachings of the present disclosure, nodes, servers, modules, mechanisms, and/or engines may be implemented in several ways. For example, they may include hardware, firmware, software, executable code, and/or a combination thereof. Platforms, which may be implementing nodes, servers, modules, mechanisms, and/or engines, may be made up of a microprocessor, a personal computer, a computer, some other computing device, or a collection thereof. Though nodes, servers, modules, mechanisms, and/or engines may have been described as individual elements, one or more may be combined and designed to operate as a single element.

The various embodiments of the present invention involve the placing of telephone calls. These calls may comprise voice communications transmitted, either alone or in combination with data, video, or other messaging via either a public switched telephone network, a public or private wireless communication network, a private telephone network, via digital subscriber line access to a computer or telephony network, cable-television-based access to a computer or telephony network, satellite-based access to a computer or telephony network, or any combination thereof.

Based upon the herein-disclosed high-level description, one or more computer programs to direct one or more computers to perform the method is within the skill of a routineer in the art of telecommunications.

Embodiments of the herein-disclosed method may be directed by computer-readable instructions encoded on a computer-readable medium. The contents of the computer-readable medium cause at least one computer to perform the herein-disclosed acts. For this purpose, at least one computer processor is responsive to the contents of the computer-readable medium. Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

In various embodiments, the wireless phone or wireless communication device may take various forms including personal digital assistants with built in communications circuitries, wireless telephones, cellular telephones, mobile telephones, and other wireless devices. Moreover, many of the devices, software, and/or pieces of equipment, referenced herein, may be SIP-enabled and may act, for example as a SIP UA.

The methods and systems described herein provide for an adaptable implementation. Although certain embodiments have been described using specific examples, it will be apparent to those skilled in the art that the invention is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A call awareness system comprising:
   an interface operable to receive a signal associated with a call to a telephone number;
   a call information engine communicatively coupled to the interface and operable to recognize that a party associated with the call subscribes to a call activity information service;
   a memory maintaining a data network address for the party and at least one notification rule for the party; and
   a messaging engine operable to send a message addressed to the data network address, irrespective of a busy status of a telephone line associated with the telephone number, when the party is recognized as a subscriber to the call activity information service and when the call satisfies the at least one notification rule, and wherein the message comprises call activity information for the call.

2. The system of claim 1, wherein the party is a calling party.

3. The system of claim 1, wherein the party is a called party.

4. The system of claim 1, wherein the call activity information comprises the telephone number.

5. The system of claim 1, further comprising:
   a subscriber interface operable to receive a new data network address associated with an active browsing session; and
   an update engine operable to initiate writing the new data network address to the memory.

6. The system of claim 1, wherein the call activity information comprises an identifier for a calling party.

7. The system of claim 1, wherein the messaging engine is operable to send the message using a service selected from the group consisting of electronic mail, browser pop-ups, mobile alerts, an Instant Message (IM) service, a Short Messaging Service (SMS), an Enhanced Messaging Service (EMS), and a Multi-media Messaging Service (MMS).

8. The system of claim 1, further comprising a call disposition engine operable to initiate sending of a call disposition query to the data network address and to receive a call disposition command indicating a preferred call disposition.

9. The system of claim 8, further comprising:
   a call suspension mechanism operable to hold the call during at least a portion of a time window associated with sending the call disposition query; and
   a call completion engine operable to route the call in accordance with the call disposition command.

10. The system of claim 9, wherein the call completion engine routes the call to the telephone line associated with the telephone number, and further comprising a data network interface operable to communicate the message via a packet switched network.

11. A method, comprising:
   receiving, at a call notification center, a signal indicating a call from a user of a first electronic device to a telephone number;
   determining, at the call notification center, that a party associated with the call subscribes to a call activity information service;
   determining, at the call notification center, that the call satisfies at least one stored notification rule for the party;

determining, at the call notification center, a second electronic device associated with the party to be notified when the at least one stored notification rule is satisfied; and sending a message from the call notification center to the party at the second electronic device irrespective of a busy status of a telephone line associated with the telephone number, wherein the message comprises call activity information for the call.

12. The method of claim 11, further comprising completing the call by initiating establishment of a circuit switched connection with the first electronic device.

13. The method of claim 11, wherein the first electronic device comprises a home telephone.

14. The method of claim 11, wherein the first electronic device comprises a wireless telephone.

15. The method of claim 11, further comprising storing addressing information for the second electronic device.

16. The method of claim 15 further comprising:
suspending the call; and
sending a call disposition query to the second electronic device as part of the message.

17. The method of claim 16, further comprising receiving a response to the call disposition query, wherein the response indicates a desired disposition of the call.

18. The method of claim 16, further comprising routing the call as dialed in the absence of a timely response to the call disposition query.

19. The method of claim 11, wherein the at least one stored notification rule includes a setting selected from the group consisting of a send message in connection with all incoming calls setting, a send message in connection with all outgoing calls setting, a send message in connection with outgoing international calls setting, a send message in connection with outgoing calls placed to toll services setting, and a send message in connection with outgoing 911 calls setting.

20. A method, comprising:
sending an address for a first device associated with a user to an enhanced call information service node;
sending a message to the enhanced call information service node from the first device, wherein the message indicates that call information, for calls directed to at least one device associated with the user other than the first device, is to be sent to the address regardless of a busy status of the at least one device; and
receiving the call information from the enhanced call information service node for calls directed to the at least one device.

21. The method of claim 20, wherein the at least one device comprises a home telephone.

22. The method of claim 20, further comprising initiating presentation of a GUI element presenting the call information at the first device.

23. The method of claim 20, wherein the first device comprises a laptop computer.

24. A tangible computer-readable medium having computer-readable data and encoded with computer executable instructions to:
send an address for a computing device associated with a user to an enhanced call information service node, wherein the computing device contains the tangible computer-readable medium;
send a message to the enhanced call information service node, wherein the message indicates that call information, for calls directed to at least one device associated with the user other than the computing device, is to be sent to the address, and wherein the call information is to be sent to the address regardless of a busy status of the at least one device; and
receive the call information from the enhanced call information service node for calls directed to the at least one device.

25. The tangible computer-readable medium of claim 24, further encoded with computer executable instructions operable to initiate presentation of a GUI element presenting the call information at the computing device.

26. An enhanced call activity awareness method, comprising:
receiving, at a call notification center, a signal associated with a call to a telephone number, the telephone number associated with a first device;
recognizing, at the call notification center, that a party associated with the call subscribes to a call activity information service;
retrieving, from a memory of the call notification center, a data network address for the party and at least one notification rule for the party, wherein the data network address is associated with a second device; and
sending a message addressed to the data network address from the call notification center when the party is recognized as a subscriber to the call activity information service and the call satisfies the at least one notification rule regardless of a busy status of the telephone number, and wherein the message comprises call activity information for the call.

27. The method of claim 26, wherein the party is a called party.

28. The method of claim 26, wherein the party is a calling party.

29. The method of claim 26, wherein the call activity information comprises at least one of the telephone number and an identifier for a calling party.

30. The method of claim 26, further comprising:
suspending the call; and
sending a call disposition query as part of the message.

31. The method of claim 30, further comprising routing the call as dialed in the absence of a timely response to the call disposition query.

32. A call awareness system comprising:
an interface operable to receive a signal associated with a call to a telephone number, the telephone number associated with a first device;
a call information engine communicatively coupled to the interface and operable to recognize that a party associated with the call subscribes to a call activity information service;
a memory maintaining a data network address for the party and at least one notification rule for the party, wherein the data network address is associated with a second device; and
a messaging engine operable to send a message addressed to the data network address when the party is recognized as a subscriber to the call activity information service and the call satisfies the at least one notification rule regardless of a busy status of the telephone number, and wherein the message comprises call activity information for the call.

33. The call awareness system of claim 32, wherein the party is a called party.

* * * * *